United States Patent [19]

Thomas et al.

[11] 4,270,438

[45] Jun. 2, 1981

[54] SERVO BOOSTERS FOR VEHICLE BRAKING SYSTEMS

[75] Inventors: Alfred W. Thomas, Koblenz; Lutz E. A. Op den Camp, Koblenz-Moselweiss, both of Fed. Rep. of Germany

[73] Assignee: Lucas Industries Limited, Birmingham, England

[21] Appl. No.: 55,483

[22] Filed: Jul. 6, 1979

[30] Foreign Application Priority Data

Jul. 8, 1978 [GB] United Kingdom ............... 29253/78

[51] Int. Cl.³ ............................................ F15B 13/02
[52] U.S. Cl. ........................................ 91/49; 91/422; 92/98 D; 92/165 PR
[58] Field of Search ................. 92/98 D, 83, 165 R, 92/165 PR, 166; 91/49, 369 A, 422

[56] References Cited

U.S. PATENT DOCUMENTS

| 2,910,047 | 10/1959 | Plummer | 92/166 |
| 3,667,349 | 6/1972 | Siebert | 92/98 D |
| 4,024,770 | 5/1977 | Liesenborghs | 92/98 D |

Primary Examiner—Abraham Hershkovitz
Attorney, Agent, or Firm—Scrivener, Clarke, Scrivener and Johnson

[57] ABSTRACT

In order to reduce the distortion of a servo booster bousing in use the booster is provided with one or more ties which extend through the movable wall for transmitting reaction forces directly from the master cylinder housing to the vehicle bulkhead. This enables a housing of lighter weight to be employed, and an overall saving in weight to be achieved. A diaphragm support plate of the movable wall is sealed to the tie by a rolling diaphragm, and the support plate is provided with a tubular extension co-axial with the tie.

11 Claims, 3 Drawing Figures

SERVO BOOSTERS FOR VEHICLE BRAKING SYSTEMS

SPECIFIC DESCRIPTION

This invention relates to servo boosters for vehicle braking systems.

In the Provisional Specification of U.K. Patent Application No. 43644/77 dated Oct. 20, 1977 is disclosed a servo booster for a vehicle brake system of the kind having at least two shells defining a housing, a diaphragm assembly comprising a diaphragm of elastomeric or other flexible material dividing the housing into at least two chambers and a support plate, and a control valve assembly, in which the housing is formed by lightweight shells coupled together by means of ties in the form of studs which pass through the diaphragm assembly and which enable said shells to be clamped together.

In the Provisional Specification of U.K. Patent Application No. 2488/78 dated Jan. 21, 1978 is disclosed a modified construction in which the lightweight housing shells are coupled together by means of at least one stud.

In the construction described in Application No. 43644/77 the diaphragm assembly is sealed to the ties by sliding seals carried by the diaphragm support plate.

According to the present invention a servo booster for a vehicle braking system comprises a housing, a movable wall dividing the interior of the housing into two chambers and adapted to apply a force to an output member when the chambers are subjected to a pressure differential in response to a force applied to an input member, the movable wall comprising a main diaphragm supported by a diaphragm support plate, and at least one tie extending through the support plate from one housing wall to a housing wall on the opposite side of the movable wall and substantially parallel to the direction of movement of the support plate, the support plate being provided with a tubular extension substantially co-axial with the tie, and the tie being sealed to the support plate by a rolling diaphragm of which one end is sealed to the tubular extension and the other end is sealed to the tie.

There are various functions which the tubular extension may perform in conjunction with the rolling diaphragm.

When the rolling diaphragm has a portion which is situated within the tubular extension that portion is preferably closely spaced radially from or in engagement with the radially inner surface of the tubular extension.

The tubular extention supports the rolling diaphragm and thus prevents ballooning of the rolling diaphragm when it is subjected to high pressure differentials. Ballooning is undesirable since it leads to a reduction in the effective area of the movable wall.

In the following description and claims when we refer to the 'ends' of the rolling diaphragm we mean the free ends of the flexible web which constitutes the rolling diaphragm and it will be appreciated that these 'ends' may not be at the front and rear of the rolling diaphragm in the assembled booster.

Preferably one end of the rolling diaphragm is sealed to the tubular extension by an end portion of the rolling diaphragm seated on the radially outer surface of the tubular extension.

Preferably the tubular extension is provided with a part which is directed radially inwardly towards the tie to resist transverse movement of the movable wall relative to the tie.

The tubular extension preferably projects forwardly from the support plate, in the direction towards the output member, and said part comprises a radially inwardly directed flange at the front end of the tubular extension, and the flange and may be formed with radial slits to define resilient fingers engaging with the tie so as to reduce friction forces.

In a preferred arrangement the main diaphram has its radially inner periphery seated in an annular trough provided on the support plate and co-axial with the central axis of the movable wall, the base of the trough faces radially outwards from said axis and is substantially tangential to the radially outer surface of the tubular extension, the tubular extension is provided at one end with an annular formation which is clasped by said one end of the rolling diaphragm, and an integral web loosely connects said one end of the rolling diaphragm to the inner periphery of the main diaphragm.

This arrangement has the advantages that the main diaphragm and the rolling diaphragm can be moulded as a single member, yet the loose web connecting them together enables them independently to seat themselves in position in the booster without subjecting each other to stresses due to normal manufacturing tolerances in the booster components.

The invention will now be described, by way of example only, with reference to the accompanying drawings in which.

Figure 1:
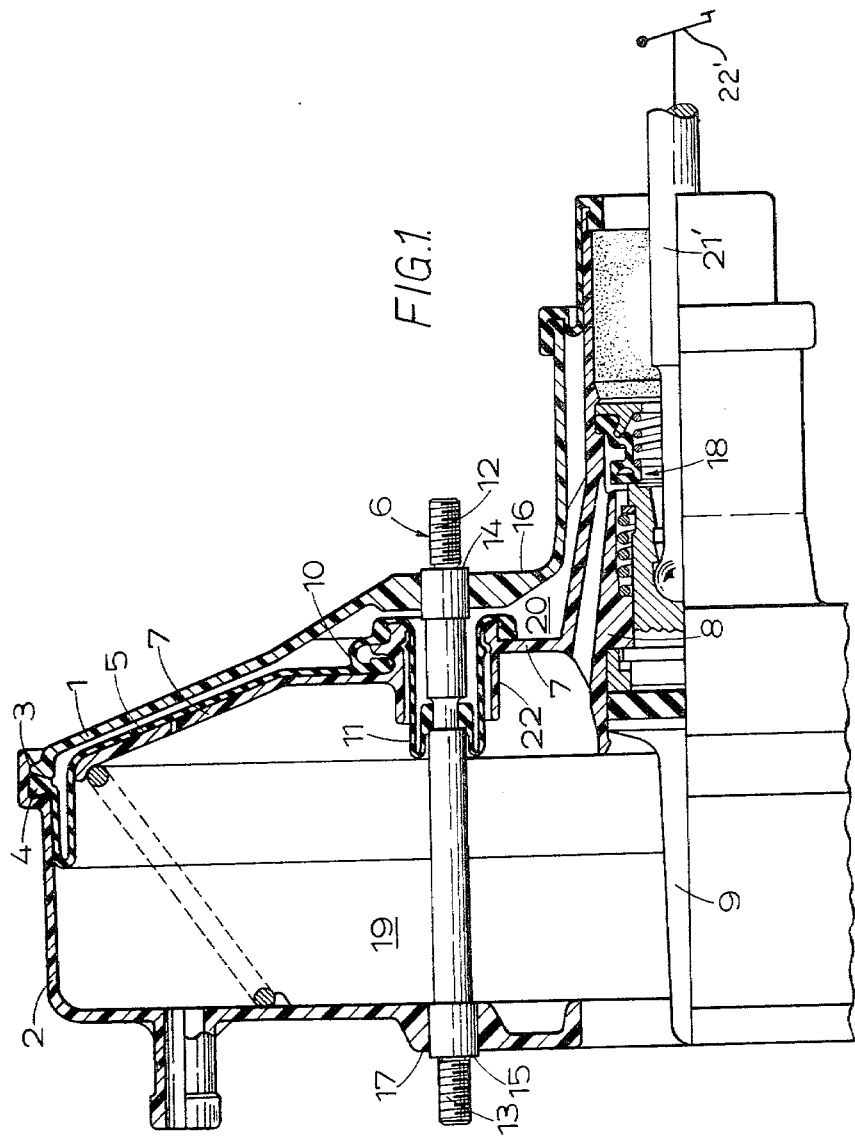
FIG. 1 is a longitudinal cross-section of a booster in accordance with the invention, the movable wall being shown in a retracted position.

With reference to FIG. 1 the servo booster comprises moulded plastics housing shells 1 and 2 adapted to have a snap engagement with each other at 3 and to trap therebetween the outer peripheral bead 4, of generally trapezoidal cross-section, of a flexible main diaphragm 5. A pair of stationary metal tie rods 6 extend axially through the shells and through a moulded plastics diaphragm support plate 7 integral with a generally cylindrical valve body 8. The tie rods 6 are disposed diametrically opposite to each other, and preferably with their axes equidistant from the axis of an output rod 9. The diaphragm 5 is connected by a respective loose web 10 to a respective integral rolling diaphragm 11 which seals the diaphragm support plate 7 to the respective tie rod 6.

The tie rod 6 has threaded, reduced end portions 12 and 13 for connection respectively to a vehicle bulk head and to a master cylinder housing. Shoulders 14 and 15 on the tie rods project beyond the adjacent outer surfaces 16 and 17 respectively of the housing shells and are adapted to engage with faces on the master cylinder and booster assembly.

A poppet valve assembly 18 controls the differential pressure of chambers 19 and 20 bounded by opposite sides of the movable wall constituted by main diaphragm 5 and diaphragm support plate 7. The poppet valve assembly operates in well-known manner in response to the axial displacement of an input rod 21' relative to the valve housing 8, the input rod 21' being operable by a pedal 22'.

Figure 2:
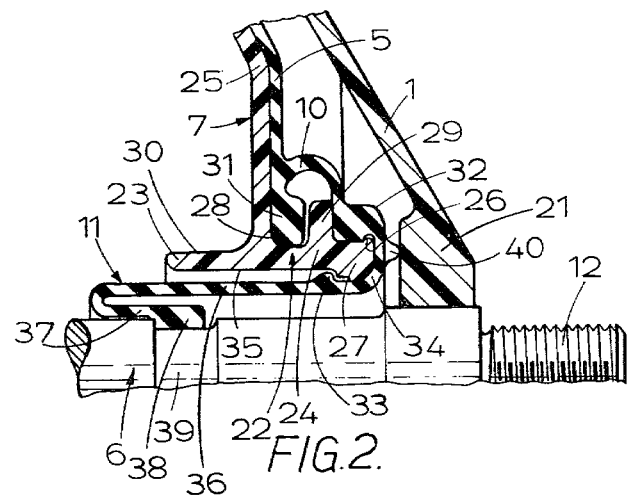
FIG. 2 is an enlargement of part of FIG. 1 showing a rolling diaphragm.

FIG. 2 is an enlarged view of the rear end of one of the ties 6 showing details of the respective rolling diaphragm 11. Each tie 6 is sealed to the rear housing shell 1 by having a thickened portion 21 of housing shell 1 moulded around it. For each tie 6 the diaphragm support plate 6 is provided with an integral tubular extension 22 comprising portions 23 and 24 which project forwardly and rearwardly respectively from the main part 25 of plate 7. Portion 24 is provided at its rear end with a small radially outwardly directed annular projection 26 and with a larger radially inwardly directed annular projection 27.

An annular trough 28 co-axial with the axis of the booster output and input members 9 and 21', of which the base faces radially outwards from the axis, is defined between an annular radially outwardly directed flange 29, which is also co-axial with said axis, and the rear face of the main part 25 of diaphragm support plate 7. The trough 28 surrounds both the tubular extensions 22, and the base of the trough 28 is tangential to the radially outer surface 30 of each tubular extension 22.

In accordance with a preferred feature of the of the invention the main diaphragm 5 is provided at its radially inner periphery with a first bead 31 seated in tension in the annular trough 28, the rolling diaphragm is independently secured at one of its ends to the movable wall by a second peripheral bead 32 located under tension between flange 29 and projection 26, to effect a sealing engagement with tubular extension portion 24 and the second bead 32 is connected to the main diaphragm 5 adjacent to bead 31 by loose web 10. The loose web 10 enables the main diaphragm 5 to seat itself on plate 7 without being affected by the seating of the rolling diaphragm 11 on the extension 22, and vice versa.

A further annular projection in the form of a circumferential rib 33 is formed integrally with the rolling diaphragm 11 on the surface adjacent to the inner surface 35 of the tubular extension 22. The rib, or bead, 33 is so positioned as to engage the step formed by annular projection 27 and surface 35, thereby providing means by which the movable wall assembly can initiate action of diaphragm 11.

In accordance with the another preferred feature of the invention surface 35 is closely spaced radially from the flexible part 36 of the rolling diaphragm 11 to provide a support surface which will resist ballooning of the rolling diaphragm 11 in the event of high differntial pressures between chambers 19 and 20.

The other end 37 of each rolling diaphragm is integral with a respective annular bead 38 seated in an annular recess 39 in the respective tie 6.

A series of circumferentially spaced rearwardly directed projections 40 integral with web 34 determine the retracted position of the movable wall by their abutment with rear housing shell 1.

Figure 3:
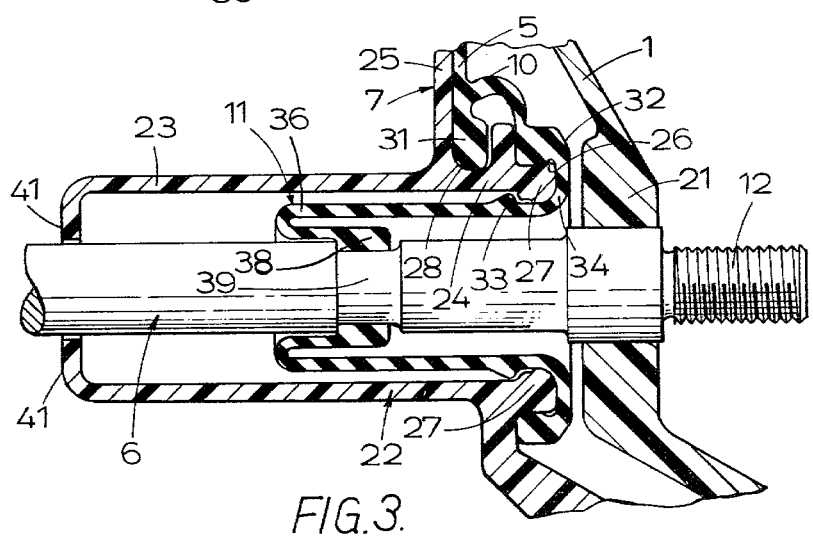
FIG. 3 is a view similar to FIG. 2 but of a modification.

In FIG. 3 corresponding reference numerals have been applied to parts corresponding to those of the construction of FIGS. 1 and 2. The embodiment of FIG. 3 is identical to that of FIGS. 1 and 2 except that the tubular extension portion 23 has been modified by making it longer and providing it with a radially inwardly directed flange 41 which resists movement of the movable wall transversely of the tie 6 by engagement therewith, thereby guiding the movement of the movable wall and also preventing distortion of the main diaphragm 5. The flange 41 and an adjacent length of the extension portion 23 may be provided with a series of circumferentially spaced radial slits defining fingers to reduce the friction forces between flange 41 and the tie.

We claim:

1. A servo booster for a vehicle braking system comprising a housing, a pedal-operated input member and an output member, a movable wall dividing the interior of said housing into two chambers, a valve assembly controlling the differential pressure between said chambers in response to movement of said input member, a main diaphragm and a diaphragm support plate of said movable wall, first and second housing walls disposed on opposite sides of said movable wall, a stationary tie extending through said support plate from said first to said second housing wall, a tubular extension co-axial with said tie, means rigidly connecting said tubular extension to said support plate, and a rolling diaphragm, a first end of said rolling diaphragm being sealed to said tubular extension, and a second end of said rolling diaphragm being sealed to said tie.

2. A servo booster as claimed in claim 1 wherein a portion of said rolling diaphragm is situated within said tubular extension.

3. A servo booster as claimed in claim 2 including a radially inner surface of said tubular extension, said portion of said rolling diaphragm being situated adjacent to said radially inner surface.

4. A servo booster as claimed in claim 1 including first and second ends of said rolling diaphragm, a radially outer surface of said tubular extension, and a sealing engagement between said first end of said rolling diaphragm and said outer surface of said tubular extension.

5. A servo booster as claimed in claim 4 wherein said first end of said rolling diaphragm comprises an annular bead.

6. A servo booster as claimed in claim 1 wherein a part of said tubular extension is directed radially inwardly toward said tie.

7. A servo booster as claimed in claim 1 wherein a radially inner periphery of said main diaphragm is sealed to the diaphragm support plate, and said radially inner periphery surrounds said tubular extension.

8. A servo booster as claimed in claim 7 including an annular trough on said diaphragm support plate and co-axial with the central axis of the movable wall, a base of the trough facing radially outwards from said axis, and a radially inner periphery of the main diaphragm seated in said trough.

9. A servo booster as claimed in claim 8 wherein said base of said annular trough is substantially tangential to the radially outer surface of the tubular extension.

10. A servo booster as claimed in claim 9 including an annular formation at one end of said tubular extension, said first end of the rolling diaphragm being engaged around said annular formation and an integral web loosely connecting said first end of said rolling diaphragm to the inner periphery of the main diaphragm.

11. A servo booster as claimed in claim 2 comprising first and second portions of said tubular extension projecting respectively from opposite sides of said diaphragm support plate.

* * * * *